Patented May 23, 1950

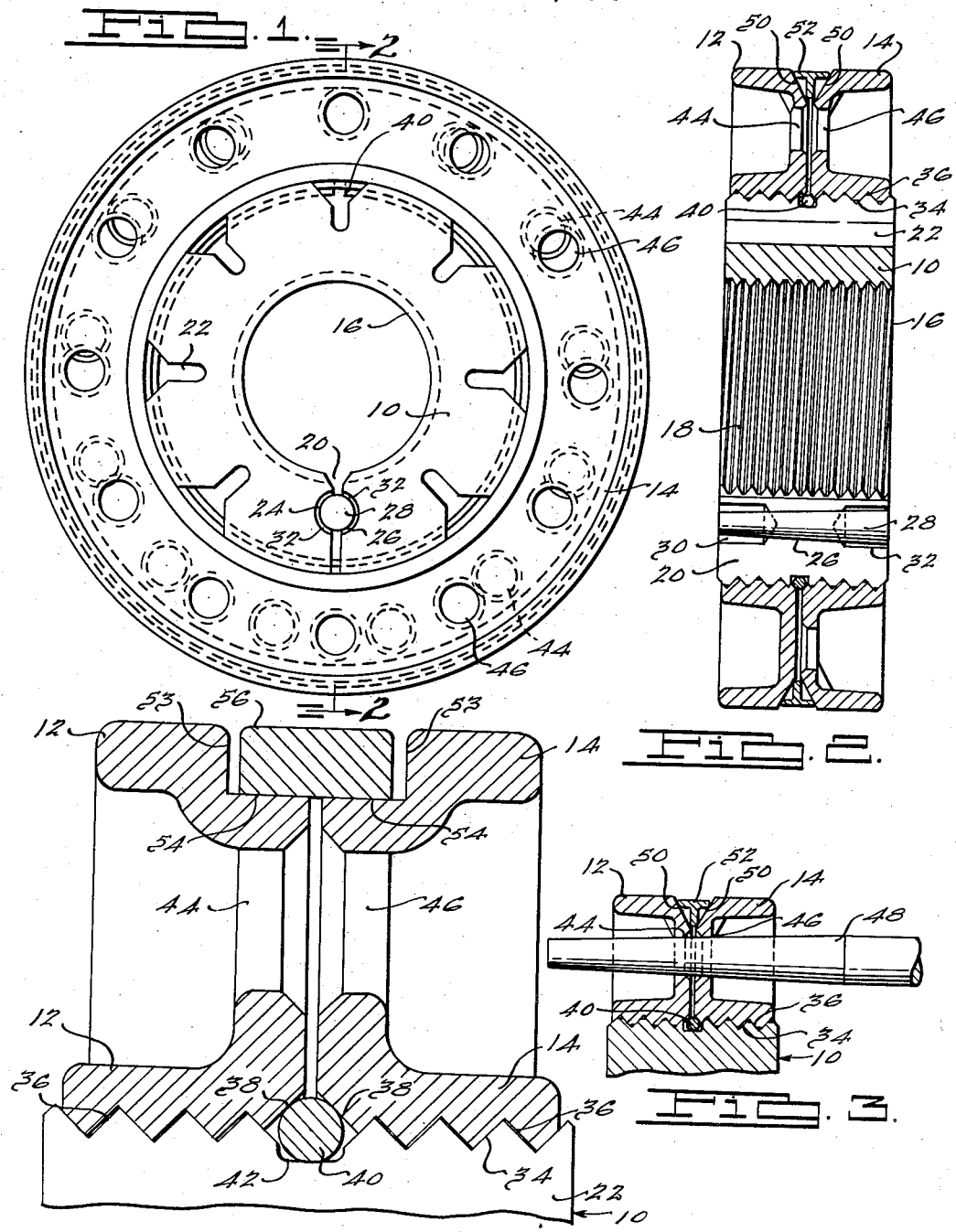

2,508,826

UNITED STATES PATENT OFFICE 2,508,826

RING GAUGE

George Hohwart and Ernest F. Hohwart, Detroit, Mich., assignors to N. A. Woodworth Company, Ferndale, Mich., a corporation of Michigan Application January 31, 1946, Serial No. 644,604

11 Claims. (Cl. 33—178)

This invention relates broadly to new and useful improvements in adjustable ring gages and more particularly to an improved means for radially adjusting the gage body.

In conventional ring gages, the gage body is contractible so that the diameter of the gaging bore can be adjusted. Although the range of adjustment is usually small, difficulty is sometimes encountered in making even a relatively small adjustment by a light weight, mechanically simple and manually operable means. One thing that makes the gage difficult to adjust is the gage body itself which is a relatively heavy, annular piece of metal that offers considerable resistance to contraction. The gage is handled manually and should be as light as possible; however, since it is occasionally dropped or otherwise jolted severely in use, it also must be strong and rugged in construction. Thus, not only should the gage be easily adjusted and light in weight, but the adjusting means must hold the body rigid and in proper adjustment during normal handling and abuse.

An important object in the present invention is to provide a ring gage having novel means for applying radially compressive forces against the gage body.

Another object of the invention is to provide a ring gage in which a greater proportion of the force imposed by the adjusting means is transmitted radially against the gage body.

Still another object of the invention is to provide a ring gage of the above type that is light in weight.

Yet another object of the invention is to provide an adjustable ring gage that is simple in construction, yet sufficiently strong and rugged to withstand normal handling and abuse.

Other objects and advantages of the invention will be apparent during the course of the following description.

In the drawing forming a part of this specification and wherein like numerals are employed to designate like parts throughout the same, Fig. 1 is a side elevational view of an adjustable ring gage embodying the invention, Fig. 2 is a diametric sectional view taken on the line 2—2 of Fig. 1, Fig. 3 is a fragmentary view similar to Fig. 2 showing one means for actuating the adjusting elements which contract the gage body, and Fig. 4 is an enlarged, fragmentary view similar to Fig. 2 but showing a modified means for adjusting the gage body.

Considered in certain of its broader aspects, the ring gage embodying the instant invention is generally similar to the gage disclosed in our copending application Serial No. 562,058, which was filed November 6, 1944, and matured into patent No. 2,413,566 on the 31st day of December, 1946. All of the advantages alleged for the prior device are inherent in the present construction, and, in addition, the latter is uniquely formed to substantially increase the pressure that is exerted against the gage body by a given application of force to the adjusting members.

More specifically, the present construction includes a split metal wire or ring which is carried by the body and is simultaneously engaged by reentrant bearing surfaces on the adjusting elements. This ring limits inward movement of the adjusting elements and thus automatically centers the gage body longitudinally in the elements. Furthermore, tightening of the adjusting elements applies radial pressure on the body simultaneously through the thread surfaces and ring. Thus, the present construction exerts substantially the same amount of pressure through the thread surfaces as is exerted by the previous construction and, in addition, applies radial thrust through the split metal ring. The increment of force exerted through the metal ring is substantial and is estimated to be roughly equal to the pressure exerted by the total thread surfaces.

For a more detailed description of the invention reference is had to the accompanying drawings, wherein the numeral 10 designates the gage body and the numerals 12 and 14 designate the adjusting elements or rings.

The gage body 10 is provided with a gaging bore 16 which is adapted to receive and snugly fit a workpiece to be tested. In so far as the present invention is concerned it is immaterial whether the bore 16 be plain or threaded; however, for the purpose of illustration, the bore is shown with internal screw threads 18.

In order to make the body 10 radially contractible it is provided with the usual locking slot 20 and adjusting slots 22. The former extends entirely through the body, and the latter extend inwardly from the periphery but terminate short of the bore 16. The function of adjusting slots 22 is primarily to increase the flexibility of the gage body and to effect uniform contraction and expansion of the gaging bore 16. Any desired number of adjusting slots may be provided, depending upon the size of the gage body and the range of adjustment, and they preferably decrease in depth away from the locking slot 20, as shown in Fig. 1.

Extending axially through the locking slot 20 and seating in longitudinally tapered grooves 24 and 26 provided in the ends of the body 10 is a tapered locking pin 28. When pin 28 is driven solidly into locking slot 20, it expands the gage body 10 against the adjusting elements 12 and 14 and holds the parts in selected adjusted positions. As best shown in Fig. 2, countersinks 30 and 32 radially relieve the terminal portions of locking pin 28 so that pressure exerted by the pin against the walls of slot 20 is confined to the middle portions thereof. By relieving the terminal portions of the pin in this manner, there is less possibility of the gage body being distorted due to improper fit between the pin and the grooves 24 and 26.

The body 10 is provided with peripheral threads 34 which engage internal threads 36 of locking elements 12 and 14. These threads are adapted to transmit radial thrust from the adjusting element to the body when the former are tightened. Any V thread may be used, but it is preferred to use a 90° thread, as shown in the drawing. In general, threads having a relatively great angle are capable of transmitting pressure from the adjusting elements 12 and 14 more efficiently than threads having a smaller angle.

At their inner sides the adjusting elements 12 and 14 are provided with re-entrant bearing surfaces 38 which are adapted to press against a split metal ring 40 which fits in a peripheral groove 42 provided medianly in the body 10. The bearing surfaces 38 preferably are disposed at an angle of 45°, and the groove 42 is formed with a flat bottom wall which is disposed axially of the body. It will be observed that the bearing surfaces 38 first engage ring 40 while the adjusting members 12 and 14 are spaced substantially apart. Movement of the adjusting elements axially against the ring 40 exerts pressure against the latter which then transmits a radial component of such pressure against the body 10. At the same time, the angularly disposed surfaces of threads 34 and 36, which sustain axial pressure exerted by the adjusting elements, transmit a radial component of such pressure against the body. The combined radial components of pressure exerted against the body by threads 34 and 36 and by the split metal ring 40 contracts the gage body 10.

As disclosed in our copending application hereinabove referred to, the body 10 can be contracted by threads 34 and 36 only, but a considerably greater amount of force must be exerted by adjusting elements 12 and 14 than if the split metal ring 40 is also employed. Thus, the ring 40 greatly increases the efficiency of the means for adjusting the gage body 10. It is estimated that the radially contracting force exerted by ring 40 is substantially equal to the radially contracting force exerted by all of the thread surfaces.

Groove 42 preferably snugly receives the ring 40 so that the latter has very little, if any, lateral or axial movement therein. Thus, the ring limits inward movement of the adjusting elements 12 and 14 and, consequently, longitudinally centers the body 10 in such elements. This adjustment is automatic and assures full engagement of the threads 36 with the external threads 34. Moreover, by recessing the metal ring 40 in the body 10, it remains associated with the latter when adjusting elements 12 and 14 are removed and thus is not easily lost.

Any suitable means for rotating adjusting elements 12 and 14 on the gage body 10 can be employed. One means here shown, by way of illustration, comprises annular series of holes 44 and 46 in adjusting elements 12 and 14 respectively. The two series of holes have the same circle diameter, but one series is provided with a greater number of holes than the other. Thus, when two of the holes align, the holes at opposite sides thereof are progressively offset. In Fig. 1 the uppermost holes are shown in alignment. To rotate the adjusting elements 12 and 14, it is merely necessary to drive a tapered pin 48 into two of the offset holes, as shown in Fig. 3. If the pin 48 is inserted in the offset holes at one side of the aligned holes, the adjusting elements 12 and 14 are tightened on the body 10, and, if the pin is inserted in the offset holes at the other side of the aligned holes, the adjusting elements are loosened.

The inner peripheral corners of adjusting elements 12 and 14 are formed with beveled surfaces 50 which accommodate a slit band 52. The latter conveniently may be made of a suitable plastic material and is suitably colored to distinguish the "go" from the "no go" gage.

Threads 36 necessarily fit rather loosely on thread 34, and this condition may cause the adjusting elements 12 and 14 to move radially out of alignment when they are tightened. If such misalignment should occur, recesses 53 formed with axially aligned flat bottom surfaces 54 may be provided in place of the beveled surfaces 50 and fitted with a rigid metal band 56 which bridges the adjusting elements 12 and 14 and fits snugly against surfaces 54 to solidly hold the elements in axial alignment on the gage body. Of course, the outer surface of band 56 can be similarly colored to distinguish the "go" gage from the "no go" gage.

When adjusting the gage, the usual procedure is to remove the locking pin 28 and screw a master thread gage plug into the gaging bore 16. Adjusting elements 12 and 14 are then tightened until the gage body 10 is contracted sufficiently so that the master plug can no longer be rotated. Locking pin 28 is then driven into the locking slot 20 to expand the gage body 10 sufficiently so that the master plug can be rotated with precisely the desired amount of resistance from the gaging bore 16. The plug is then removed, and the gage is properly set to test any workpiece identical to the plug. It will be readily apparent that expansion of the gage body so increases the friction between threads 34 and 36 that the adjusting elements 12 and 14 are positively locked in the selected adjusted position. Thus, when the parts are adjusted in the manner above described, it is unnecessary to provide extraneous means for locking the adjusting elements. Friction between the gage body and the adjusting elements is sufficient to hold the latter stationary, and the gage will not get out of adjustment during normal handling or abuse.

It is to be understood that the forms of the invention herewith shown and described are to be taken as preferred examples of the same and that various changes in size, shape, and arrangement of parts may be resorted to without departing from the spirit of the invention or the scope of the appended claims.

Having thus described the invention, we claim:

1. An adjustable ring gage comprising a radially contractible gage body having a gaging bore; a pair of adjusting elements axially movable on the body and having radially extending annular confronting surfaces, the confronting surfaces of said elements provided with re-entrant bearing surfaces which face the periphery of the body and co-operate therewith to define a cavity; and a thrust member in said cavity seating on the periphery of the body and simultaneously engaging the bearing surfaces, the arrangement being such that pressure imposed on said thrust member by the bearing surfaces is transmitted to the body whereby to contract the same.

2. An adjustable ring gage comprising a radially contractible gage body having a gaging bore; a pair of adjusting elements axially movable on the body and having radially extending annular confronting surfaces, the confronting surfaces of said elements provided with axially aligned re-entrant bearing surfaces which open against the periphery of the body; and a split ring member disposed between the body and said adjusting elements engaging the body and said bearing surfaces simultaneously to transmit force from the adjusting elements substantially radially against the body whereby to contract the latter.

3. An adjustable ring gage comprising a radially contractible gage body having a gaging bore; a pair of adjusting elements axially movable on the body and having radially extending annular confronting surfaces, the confronting surfaces of said elements provided with re-entrant bearing surfaces which face the periphery of the body and co-operate therewith to define a cavity; means for positively moving said adjusting elements axially on the body and for holding the same in a selected adjusted position; and a radially split, contractible thrust member in said cavity seating on the periphery of the body and simultaneously engaging the bearing surfaces, the arrangement being such that pressure imposed on said thrust member by said bearing surfaces is transmitted subsantially radially against the body whereby to contract the same.

4. An adjustable ring gage comprising a radially contractible gage body having a gaging bore; a pair of adjusting elements axially movable on the body and having radially extending annular confronting surfaces, the confronting surfaces of said elements provided with annular re-entrant bearing surfaces which open against the periphery of the body; means for positively moving said adjusting elements axially on the body and for holding the same in a selected adjusted position; and a radially split, contractible ring member disposed between the body and said adjusting elements engaging the body and said bearing surfaces simultaneously to transmit force from the adjusting elements substantially radially against the body whereby to contract the latter.

5. An adjustable ring gage comprising a radially contractible gage body having a gaging bore; a pair of adjusting elements axially movable on the body and having radially extending annular confronting surfaces, the confronting surfaces of said elements provided with annular re-entrant bearing surfaces which open against the periphery of the body; means for positively moving said adjusting elements axially on the body and for holding the same in a selected adjusted position; means for positively holding the adjusting elements axially aligned on the body; and a radially split, contractible ring member disposed between the body and said adjusting elements engaging the body and said bearing surfaces simultaneously to transmit force from the adjusting elements substantially radially against the body whereby to contract the latter.

6. An adjustable ring gage comprising a radially contractible gage body having a gaging bore; a pair of adjusting elements axially movable on the body and having radially extending annular confronting surfaces, the confronting surfaces of said elements provided with annular re-entrant bearing surfaces which open against the periphery of the body; means for positively moving said adjusting elements axially on the body and for holding the same in a selected adjusted position; a rigid band surrounding and snugly fitting the adjusting elements for holding the same in axial alignment on the body; and a split ring member engaging the body and said bearing surfaces simultaneously to transmit force from the adjusting elements radially against the body whereby to contract the latter.

7. An adjustable ring gage comprising a radially contractible externally screw-threaded gage body having a gaging bore; a pair of adjusting elements independently received on the body, said elements having internal screw threads engaged with the external threads of the body and the confronting surfaces of said elements provided with axially aligned re-entrant bearing surfaces which open against the periphery of the body, said external and internal threads having surfaces disposed at an angle to the axis of the gage; and a thrust member seating against the periphery of the body and simultaneously engaged by the bearing surfaces, said thrust member holding the adjustable elements normally separated whereby tightening of said elements against the thrust member applies radial pressure on the body simultaneously through the thread surfaces and said thrust member.

8. An adjustable ring gage comprising a radially contractible externally screw-threaded gage body having a gaging bore; a pair of adjusting elements independently received on the body, said elements having internal screw threads engaged with the external threads of the body and the confronting surfaces of said elements provided with axially aligned re-entrant bearing surfaces which face against the periphery of the body; said external and internal threads having surfaces disposed at an angle to the axis of the gage; means for positively holding the adjusting elements in axial alignment on the body; and a radially split, contractible thrust member seating simultaneously against the periphery of the body and said bearing surfaces, said thrust member holding the adjusting elements normally separated whereby tightening of said elements against the thrust member applies radial pressure on the body simultaneously through the threads surfaces and said thrust member.

9. An adjustable ring gage comprising a radially contractible externally screw-threaded gage body having a gaging bore; a pair of adjusting rings surrounding the body and having internal screw threads engaged with the external threads of the body, said external and internal threads having surfaces disposed at an angle to the axis of the gage, the confronting surfaces of said adjusting rings provided with annular re-entrant bearing surfaces which open against the periphery of the body; a radially split, contractible ring member surrounding and snugly fitting the body and simultaneously engaged by the bearing surfaces; and means for positively holding the adjusting rings in axial alignment on the body, said split ring member holding the adjusting rings normally separated whereby tightening of the latter rings against the split ring member applies radial pressure on the body simultaneously through the thread surfaces and said split ring member.

10. An adjustable ring gage comprising a radially contractible externally screw-threaded gage body having a gaging bore; a pair of adjusting rings independently received on the body, said rings having internal screw threads engaged with the external threads of the body and said external and internal threads having surfaces disposed at an angle to the axis of the gage, the confronting surfaces of said rings provided with annular re-entrant bearing surfaces which open against the periphery of the body; a rigid band surrounding and snugly fitting the adjusting rings for holding the latter axially aligned on the body, and a split wire ring mounted on the body, said wire ring simultaneously engaged by the periphery of the body and said bearing surfaces and holding the adjusting rings normally separated whereby tightening of the latter rings thereagainst applies radial pressure on the body simultaneously through the thread surfaces and said split ring member.

11. An adjustable ring gage comprising a radially contractible externally screw-threaded gage body having a gaging bore and an annular peripheral groove; a pair of adjusting ring elements independently received on the body, said elements having internal screw threads engaged with the external threads of the body and said external and internal threads having surfaces disposed at an angle to the axis of the gage, the confronting surfaces of said elements provided with annular re-entrant bearing surfaces disposed at opposite sides of said annular groove; and a split ring disposed in the groove and adapted to be simultaneously engaged by said bearing surfaces, the arrangement being such that axial movement of the ring on the body is limited by the side walls of the groove whereby said ring automatically centers the gage body longitudinally in the adjusting ring elements and also assists the thread surfaces in transmitting pressure from the adjusting ring elements radially against the body when said rings are tightened on the body.

GEORGE HOHWART.
ERNEST F. HOHWART.

REFERENCES CITED

The following references are of record in the file of this patent:

UNITED STATES PATENTS

| Number | Name | Date |
|---|---|---|
| 1,282,392 | Doonaevski | Oct. 22, 1918 |
| 2,000,783 | Muller | May 7, 1935 |
| 2,353,626 | Schnaars | July 11, 1944 |
| 2,356,133 | Van den Kieboom | Aug. 22, 1944 |
| 2,413,566 | Hohwart et al. | Dec. 31, 1946 |

FOREIGN PATENTS

| Number | Country | Date |
|---|---|---|
| 353,674 | Germany | May 23, 1922 |